(12) United States Patent
Tannenbaum

(10) Patent No.: US 10,392,012 B2
(45) Date of Patent: Aug. 27, 2019

(54) SYSTEM AND METHOD OF USE FOR VEHICULAR DRIVING SAFETY

(71) Applicant: Adam Benjamin Tannenbaum, Ashdod (IL)

(72) Inventor: Adam Benjamin Tannenbaum, Ashdod (IL)

( * ) Notice: Subject to any disclaimer, the term of this patent is extended or adjusted under 35 U.S.C. 154(b) by 114 days.

(21) Appl. No.: 15/495,642

(22) Filed: Apr. 24, 2017

(65) Prior Publication Data

US 2018/0304886 A1    Oct. 25, 2018

(51) Int. Cl.
| | |
|---|---|
| *B60W 30/09* | (2012.01) |
| *B60W 10/04* | (2006.01) |
| *B60W 10/18* | (2012.01) |
| *B60W 10/20* | (2006.01) |
| *B60W 50/14* | (2012.01) |
| *G01S 19/13* | (2010.01) |
| *G08G 1/16* | (2006.01) |
| *H04L 29/08* | (2006.01) |

(52) U.S. Cl.
CPC ............ *B60W 30/09* (2013.01); *B60W 10/04* (2013.01); *B60W 10/18* (2013.01); *B60W 10/20* (2013.01); *B60W 50/14* (2013.01); *G01S 19/13* (2013.01); *G08G 1/163* (2013.01); *G08G 1/166* (2013.01); *G08G 1/167* (2013.01); *H04L 67/12* (2013.01); *B60W 2050/143* (2013.01); *B60W 2050/146* (2013.01); *B60W 2420/42* (2013.01); *B60W 2510/18* (2013.01); *B60W 2510/20* (2013.01); *B60W 2550/10* (2013.01); *B60W 2550/302* (2013.01); *B60W 2550/306* (2013.01); *B60W 2550/308* (2013.01); *B60W 2550/406* (2013.01); *B60W 2710/18* (2013.01); *B60W 2710/20* (2013.01); *B60W 2750/302* (2013.01); *B60W 2750/306* (2013.01); *B60W 2750/308* (2013.01); *B60W 2750/40* (2013.01)

(58) Field of Classification Search
CPC ...... B60W 30/09; B60W 10/04; B60W 10/18; B60W 10/20; B60W 50/14; G01S 19/13; G08G 1/166; H04L 67/12
USPC .......................................................... 701/41
See application file for complete search history.

(56) References Cited

U.S. PATENT DOCUMENTS

| | | |
|---|---|---|
| 5,448,487 A | 9/1995 | Arai |
| 6,064,926 A | 5/2000 | Sarangapani et al. |
| 6,438,472 B1 | 8/2002 | Tano et al. |
| 7,102,496 B1 | 9/2006 | Ernst et al. |
| 7,233,861 B2 | 6/2007 | Van Buer et al. |
| 7,579,942 B2 | 8/2009 | Kalik |
| 8,050,863 B2 | 11/2011 | Trepagnier et al. |

(Continued)

*Primary Examiner* — Yazan A Soofi
(74) *Attorney, Agent, or Firm* — Robert Brownstein

(57) ABSTRACT

The invention and use method provides advanced warning of one or more proximate vehicle's high likelihood of action, such as lane change, speed change, turn and exit by sharing impending navigation system directives among proximate vehicles. The shared directives are combined with real-time sensors data to provide drivers and autonomous vehicles with anticipated proximate vehicle actions so as to reduce the risk of unsafe distance and speeds among the proximate vehicles. By having advanced warning, a vehicle's driver or autonomous vehicle control system has more time to anticipate and react to such actions. The system may warn and direct the driver or autonomous vehicle control system to decelerate and/or change lanes.

4 Claims, 5 Drawing Sheets

(56) References Cited

U.S. PATENT DOCUMENTS

| | | | |
|---|---|---|---|
| 8,260,515 B2 | 9/2012 | Huang et al. | |
| 8,280,601 B2 | 10/2012 | Huang et al. | |
| 8,634,980 B1 | 1/2014 | Urmson et al. | |
| 9,333,913 B1* | 5/2016 | Elders | B60Q 9/008 |
| 9,487,139 B1* | 11/2016 | Ishida | B60W 50/14 |
| 10,053,088 B1* | 8/2018 | Askeland | B60W 30/025 |
| 2008/0040023 A1* | 2/2008 | Breed | B60N 2/2863 |
| | | | 701/117 |
| 2008/0147253 A1 | 6/2008 | Breed | |
| 2009/0005959 A1 | 1/2009 | Bargman et al. | |
| 2009/0319112 A1 | 12/2009 | Fregene et al. | |
| 2010/0010742 A1* | 1/2010 | Mochizuki | G08G 1/161 |
| | | | 701/301 |
| 2010/0017056 A1 | 1/2010 | Asakura et al. | |
| 2010/0052945 A1 | 3/2010 | Breed | |
| 2010/0076640 A1 | 3/2010 | Maekawa et al. | |
| 2010/0205132 A1 | 8/2010 | Taguchi | |
| 2010/0256836 A1 | 10/2010 | Mudalige | |
| 2011/0082623 A1* | 4/2011 | Lu | B60W 10/06 |
| | | | 701/41 |
| 2012/0084364 A1* | 4/2012 | Sivavakeesar | H04L 12/1818 |
| | | | 709/205 |
| 2012/0157052 A1 | 6/2012 | Quade | |
| 2012/0323474 A1* | 12/2012 | Breed | B60W 30/04 |
| | | | 701/117 |
| 2014/0222280 A1* | 8/2014 | Salomonsson | G08G 1/167 |
| | | | 701/28 |
| 2015/0197248 A1* | 7/2015 | Breed | G08G 1/09626 |
| | | | 701/93 |
| 2015/0360697 A1* | 12/2015 | Baek | B60W 40/09 |
| | | | 701/23 |
| 2017/0113665 A1* | 4/2017 | Mudalige | G08G 1/166 |
| 2017/0332347 A1* | 11/2017 | Boss | H04W 24/08 |
| 2017/0352273 A1* | 12/2017 | Tuukkanen | G08G 1/0965 |

* cited by examiner

SYSTEM AND METHOD OF USE FOR VEHICULAR DRIVING SAFETY

TECHNICAL FIELD

The present invention relates to vehicular driving safety systems.

BACKGROUND OF THE INVENTION

Prior to the advent of vehicular navigation systems, drivers depended upon turn signaling and braking indicators of vehicles in front of them to anticipate lane changes and deceleration. If a driver failed to signal in advance, or at all, his intention to change lanes or to exit a highway, the risk of collisions increased commensurately.

Currently, with the increasing use of built-in and ad hoc navigation systems being used by drivers, they typically have a several-mile or several-kilometer advanced directive to move right or left and/or to exit at an upcoming exit. On regular roads with intersections and traffic signals, navigation systems offer preparatory directives to move and/or to turn right or left at upcoming intersections. This gives the driver who is unfamiliar with a route, or not paying attention, an advanced warning of upcoming need to move and/or turn and the like. However, vehicles traveling behind a vehicle so navigated must still depend upon turn and brake signaling in order to maintain safe inter-vehicle speed and spacing.

New technologies for navigation and automated vehicle control typically involve wireless conveyance of data among vehicles and roadside base stations. Assuming this sharing of wireless data among proximate vehicles will include upcoming navigation directives data, it becomes possible for following vehicles to get advanced knowledge of forward vehicle navigation directives, and impending actions, such as moving over and/or exiting. On regular roads, such actions could include moving over and/or turning right or left at intersections or destinations. The additional preparation time significantly lowers the risk of unanticipated actions of forward vehicles adding a significant increase in driving safety.

In conjunction with a vehicle's own built-in system of sensors that give real-time indications of inter-vehicle spacing, relative speed, and the like, the additional advanced navigation directives would provide heightened driving safety.

BRIEF SUMMARY OF THE INVENTION

The vehicular driving safety system disclosed and claimed uses shared vehicular navigation directives of proximate vehicles in conjunction with internal sensors data to provide additional reaction time by drivers to maintain safe distance and speeds on highways and regular roads.

The apparatus of the vehicular driving safety system comprises the following subsystems:
  inter-vehicle wireless communications conveyance subsystem;
  GPS receiver and satellite data processing subsystem;
  inter-vehicle information distillation subsystem;
  sensors subsystem including cameras and transducers for detecting relative spacing and speeds between proximate vehicles;
  processor and storage subsystem for processing incoming data and preparing output data for appropriate vehicular control, audible warning, and visual warning conveyance;
  control output subsystem that conveys automated control actions to steering, braking and engine-control subsystems;
  display output subsystem that converts processor output into displayed warnings; and
  audible output subsystem that converts processor output into audible warnings.

The use method for the vehicular driving safety system comprises the following actions:
  receiving shared inter-vehicle data;
  distilling impending navigation system directives from proximate vehicles;
  processing all internal sensors data;
  conditionally determining the likelihood of impending actions of forward proximate vehicles; and
  responding with vehicle control and/or warnings when high likelihood is indicated.

BRIEF DESCRIPTIONS OF THE DRAWINGS

DETAILED DESCRIPTION OF INVENTION

Figure 1:
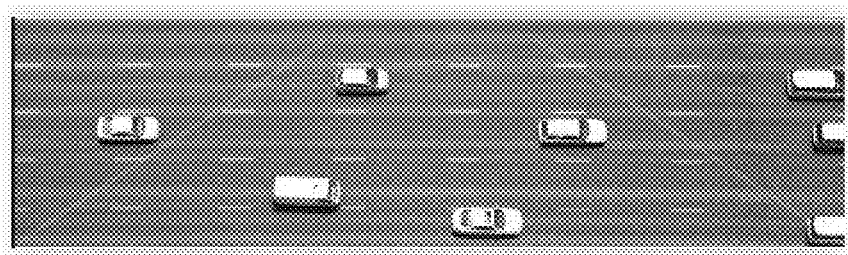
FIG. 1 depicts a typical multi-lane highway with vehicles traveling in the same direction on various lanes.

There has been much progress in automobile driving safety. Many vehicles feature anti-skid features that automatically detect and correct skid situations by monitoring wheel dynamics. Some vehicles have side-view mirror signals tied to rear sensors that alert drivers to vehicles in blind spots on either side. With the advent of autonomous driving vehicles, some of the technologies are being piloted in non-autonomous vehicles. In general most of the driving safety features are based on real-time or near-real-time detection of speed and signaling of vehicles fore and aft. Thus, in addition to a driver's own real-time reaction to turn signals and brake lights, the vehicle's own safety system could augment those real-time reactions. However, what is missing, for now, is a way to anticipate upcoming actions by vehicles in front whether in the same traffic lane or other lanes.

More and more drivers have vehicles or ancillary systems which allow setting destination objectives and then making use of GPS-derived location information to offer drivers step-by-step navigation directives culminating when the driver and vehicle reach the selected destination. In virtually all cases, the driver receives visual and/or audible directives when approaching a location requiring exiting a highway, or turning at an intersection, choosing an exit off a large traffic circle, and the like. Virtually all navigation systems, whether built-in or ancillary, will provide directives to the driver as the vehicle nears a highway split, a point of directed highway exit, a directed turn, and so on. Hence, without divulging final destination information to other vehicles, any vehicle using navigation directives, and sharing that information with proximate vehicles, potentially enables those proximate vehicles to anticipate the other vehicle's impending actions. In addition to real-time sensing of inter-vehicle positions and speeds, the advanced navigation directive information can add to a driver's anticipation and response to another vehicles likely lane changes, decelerations, exits and turns. That additional anticipation and the added decision time it affords can enhance driving safety.

As standards begin to coalesce for inter-vehicle communications among groups of proximate vehicles, one of the items to be shared could be impending navigation directives, such as a directive to exit to the right at a distance of, say, 1.5 miles, or a directive to bear right at a highway split occurring in 2.0 miles, or a directive to turn right at an intersection 400 yards or meters ahead, and so on. When proximate vehicles sharing such information process that information and recognize another vehicle's impending directives, drivers can be warned of a forward vehicles likelihood to change lanes, decelerate, and/or exit. On regular roads, such impending directives can warn ahead of upcoming right or left turns, exit choices in traffic circles, or approaching destinations and which side of the road they are found.

If such navigation directives are shared among proximate vehicles, all conveying wirelessly with one another their shared information, all such vehicles have a way now to not only detect real-time dynamics (distance, speed) of other proximate vehicles but to know in advance of upcoming likelihoods of proximate vehicle actions. For example, on a highway with multiple lanes of traffic traveling in the same direction, if a forward vehicle is currently in the inside fast lane and a trailing vehicle sees that the forward vehicle has a directive to exit within, say, one mile or two kilometers, that trailing vehicle's driver has advanced warning of the likelihood that the vehicle in the inside lane will be moving toward the outside lane in preparation to exit the highway. Most likely in addition to lane changing that forward vehicle may be decelerating in approach to the exit. None of these actions could be anticipated simply by sensing that forward vehicle's position and speed in real time. Furthermore, if the driver in the forward vehicle waits for too long and has to shoot across the lanes in order not to miss an upcoming exit, this could cause trailing vehicles to brake in order to avoid unsafe inter-vehicle spacing. However, with the advanced notice of lane-change and exit likelihood, the trailing vehicle drivers can be prepared for the forward vehicle's late moves with greater safety.

In FIG. 1, a five-lane highway is depicted with vehicles traveling in the same direction from left to right. These would be defined as proximate vehicles, that is, vehicles close enough to one another to engage in inter-vehicle wireless communications and where actions by one or more of these vehicles may have material influence on the safe speeds and inter-vehicle distances of the other proximate vehicles.

Figure 2:
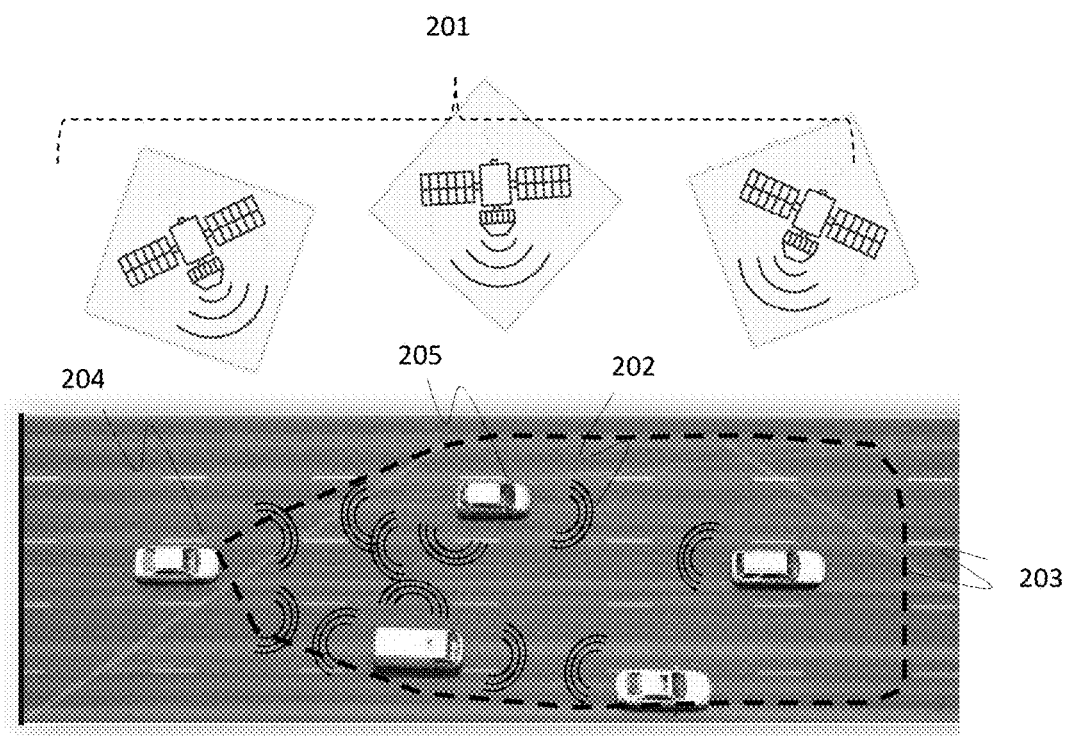
FIG. 2 depicts a subset of proximate vehicles on the highway shown in FIG. 1. Also shown are GPS satellites providing location coordinates and inter-vehicle wireless communications conveying data among the proximate vehicles.

In FIG. 2, the same highway and a subset of vehicles now constitute a group of proximate vehicles. The dotted line area depicts the area in which inter-vehicle wireless communications conveys data among the proximate vehicles. For example, vehicle 205 is forward of vehicle 204. All vehicles in the proximate vehicle group, having GPS-based navigation systems will be receiving satellite signals from the GPS satellites 201 and perhaps sharing some speed and acceleration data as well. If vehicle 205 is using a navigation system, and receives a displayed and/or audible directive to exit within one mile or two kilometers, and the exit is off of the lower lane as depicted in the drawing, vehicle 205 must move from its inside lane position (e.g. the fast line) and cross over four lanes before exiting. Unless the vehicle 204 receives that same advanced navigation directive, the first sign of vehicle 205's intention to change lanes would occur when vehicle 205's turn indicator illuminates. This could be many seconds later and increase the risk of unsafe speeds and distance between vehicle 204 and 205.

Figure 3:
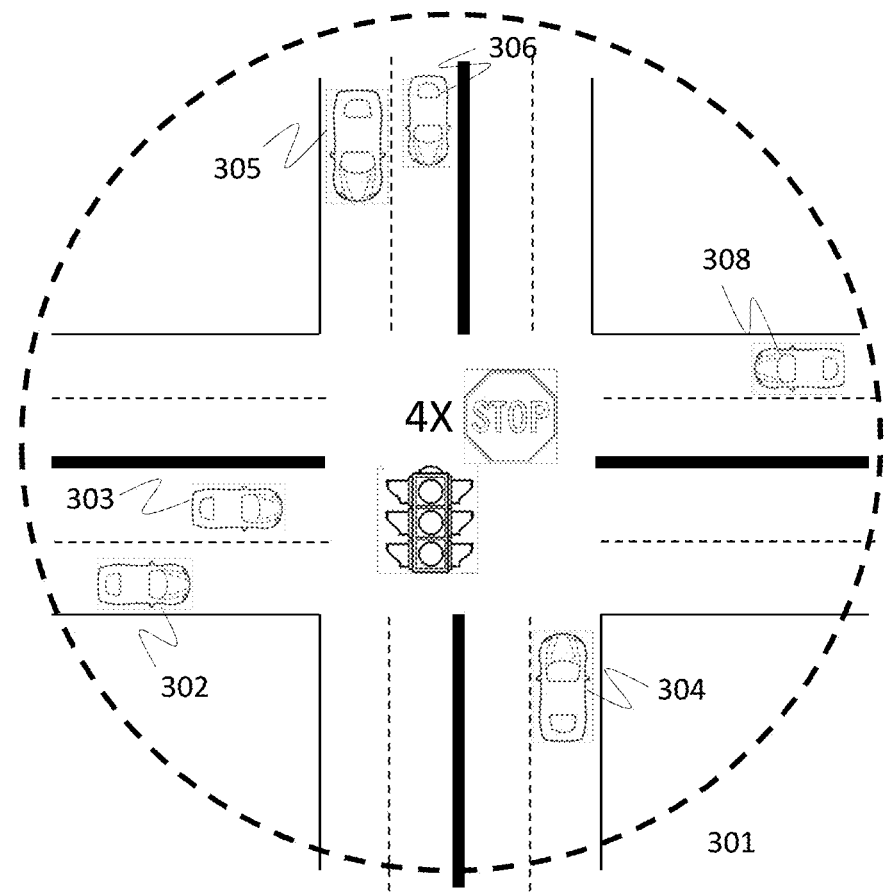
FIG. 3 depicts a regular road scenario where two roads crisscross at a common intersection. Vehicles on one road are going in the same or opposite direction; vehicles on the intersecting road are going oblique to vehicles on the first road and traveling in the same or opposite directions.

In FIG. 3 which depicts a regular road scenario where vehicles traveling in opposite directions (drawn horizontally) approach an intersection of vehicles traveling in opposite directions, (drawn vertically). The directions could be east-west and north-south. The roads both have two traffic lanes in each direction, and the intersection is served by a traffic signal of some kind.

If vehicle 303 is directed to turn right at the intersection, it would have to cross in front of vehicle 302. If vehicle 302 is in 303's blind spot on the right side, vehicle 303 may try a sudden lane change causing either 302 to swerve, brake suddenly, or collide with 302. However, if vehicle 302 had shared navigation directives with vehicle 303, the driver in vehicle 302 would have advanced notice of vehicle 303's need to turn right at that intersection. As such, the driver of 302 could have slowed down to allow vehicle 303 to safely move right and turn. In similar fashion, if vehicle 303 sees that vehicle 304 is directed to turn left at that intersection, the driver of vehicle 303 would have advanced notice of the likelihood that vehicle 304 would move left, then turn left. Similarly, if the driver of vehicle 304 sees that vehicle 308 is directed to turn right at the intersection, the driver of 304 could proceed more slowly to avoid the chance of colliding with vehicle 308 in that intersection. If the driver of vehicle 305 sees that vehicle 306 is directed to turn right at an intersection after the upcoming one, the driver of 305 could slow down to allow vehicle 306 to move right in preparation for the upcoming right turn. This again adds some margin of safety that would be missing if the vehicles can only rely on real-time turn signal and brake light indications.

Figure 4:
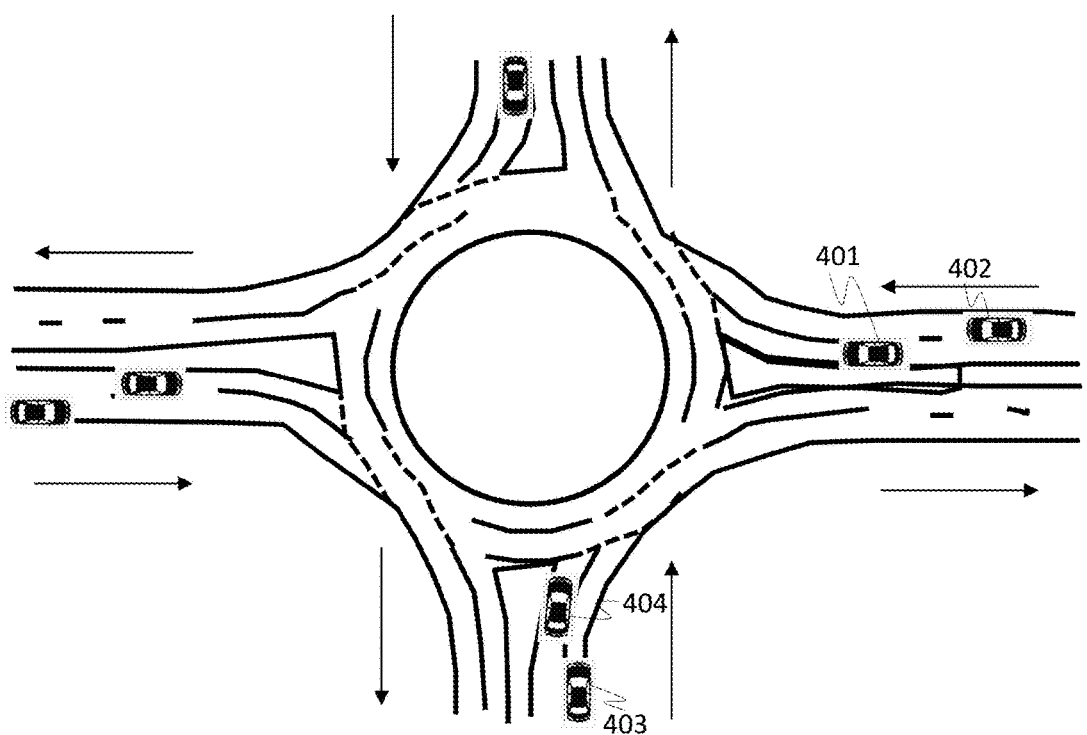
FIG. 4 depicts a multilane traffic circle scenario where intersecting sections of roads meet at a common traffic circle. Vehicles have the opportunity to exit right, continue in the same direction, go part way around the circle to exit to the left, or do a full u-turn.

FIG. 4 depicts a traffic circle where roads intersect and drivers can proceed part way around the circle to exit right, to continue in the same original direction, to exit left, or to make a U-turn. No traffic signals are used. The illustration features multilane roads and traffic circle. Vehicles 401 and 402 are traveling in the same direction before entering the traffic circle. Vehicles 403 and 404 are traveling in the same direction before entering the traffic circle. The overall direction of vehicles 401 and 402 is oblique to the direction traveled by vehicles 403 and 404. Assuming all four vehicles are using navigation and the invention system, they will receive impending navigation directives from each other. Thus, if vehicle 401 is being directed to turn right after entering the traffic circle, vehicle 402's system provides early warning of that action. This could prompt the driver of vehicle 402, or its autonomous vehicle control system, to anticipate vehicle 401 moving right in order to turn right after entering the traffic circle. As such, vehicle 402 could be decelerated to permit vehicle 401 to move and exit safely. Alternatively, the invention system may warn and direct vehicle 402 to move left. The same interaction could involve vehicles 403 and 404. With advanced warning, vehicle 403 is warned, perhaps, that vehicle 404 is being directed to turn right after entering the intersection. Here, again, vehicle 403 may decelerate to allow a safe move and exit by vehicle 404, or vehicle 403 may be direct to move left. In another case, vehicle 401 may be warned that vehicle 403 is being directed to enter the traffic circle and continue essentially in the same direction, that is, exit the circle at the second exit. That would give vehicle 401 advanced preparation time to perhaps decelerate and allow vehicle 403 to enter the traffic circle, first, so as to avoid an accident.

Figure 5:
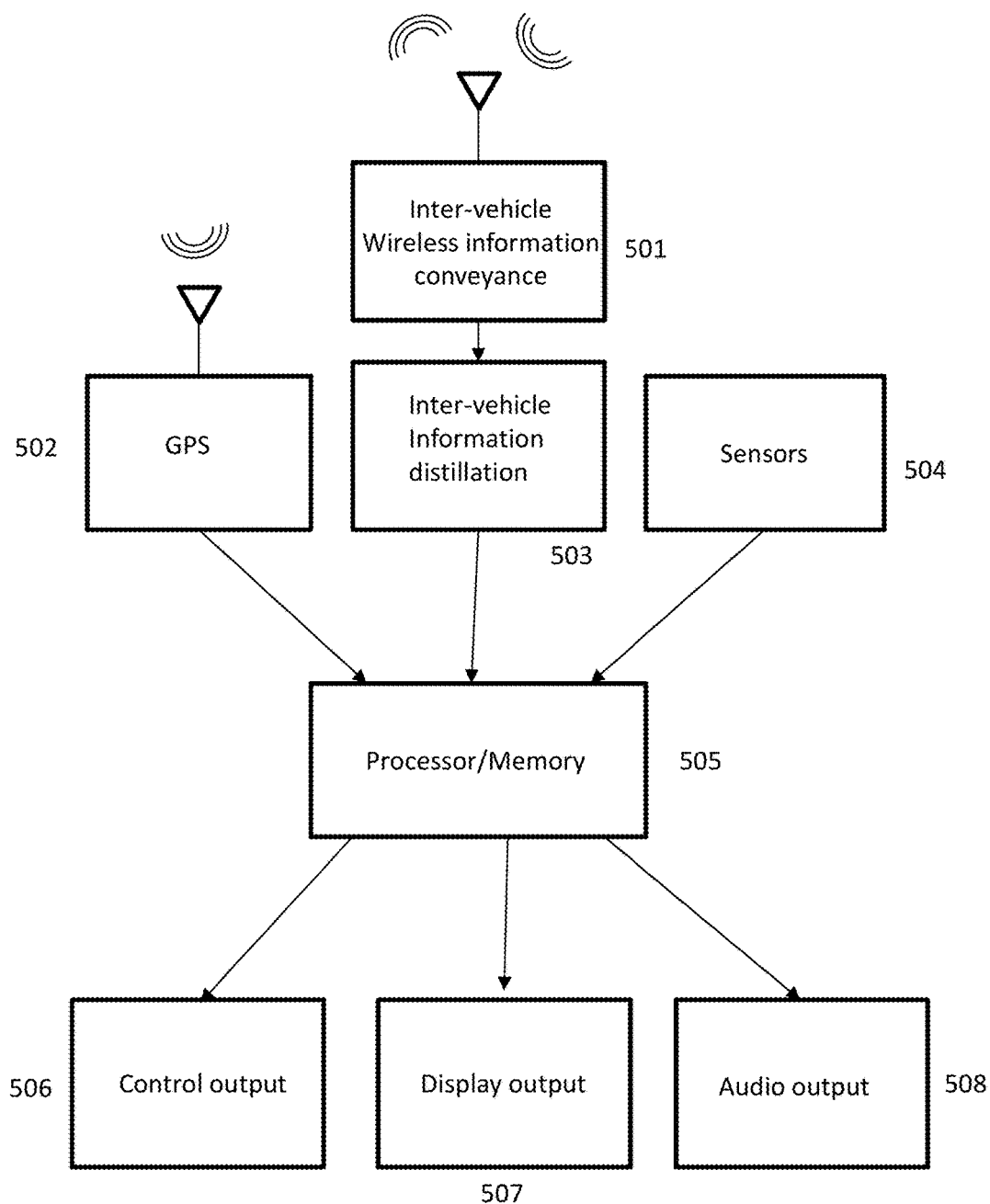
FIG. 5 depicts one embodiment of the vehicle driving safety system apparatus and their connectivity relationships

FIG. 5 depicts one embodiment of the vehicular driving safety system. Incoming and outgoing data from the proximate vehicles is conveyed by an inter-vehicle wireless information conveyance subsystem (501). An inter-vehicle information distillation subsystem (503) parses that incoming information to include shared information of impending navigation directives. A GPS subsystem (502) receives GPS satellite signals and computes the vehicles real-time location coordinates. A sensors subsystem, 504, comprising cameras and other detectors produces proximate vehicle dynamics data for its vehicle's sides, front and rear. The data from subsystems 502, 503 and 504 are all conveyed to a processor and memory subsystem (505) where a program or programs processes the incoming data and determines a likelihood of impending vehicle actions. Where the likelihood exceeds some predetermined value, the processor and memory subsystem will output the appropriate data to a control output subsystem (506) which in turn sends control commands to steering, braking and engine-control subsystems (not shown). In addition, a display output subsystem (507) displays a warning message to its driver alerting him or her to an impending action of a forward vehicle. Similarly, an audio output subsystem (508) conveys an audible message to its driver with a warning of an impending action of a forward vehicle.

Figure 6:
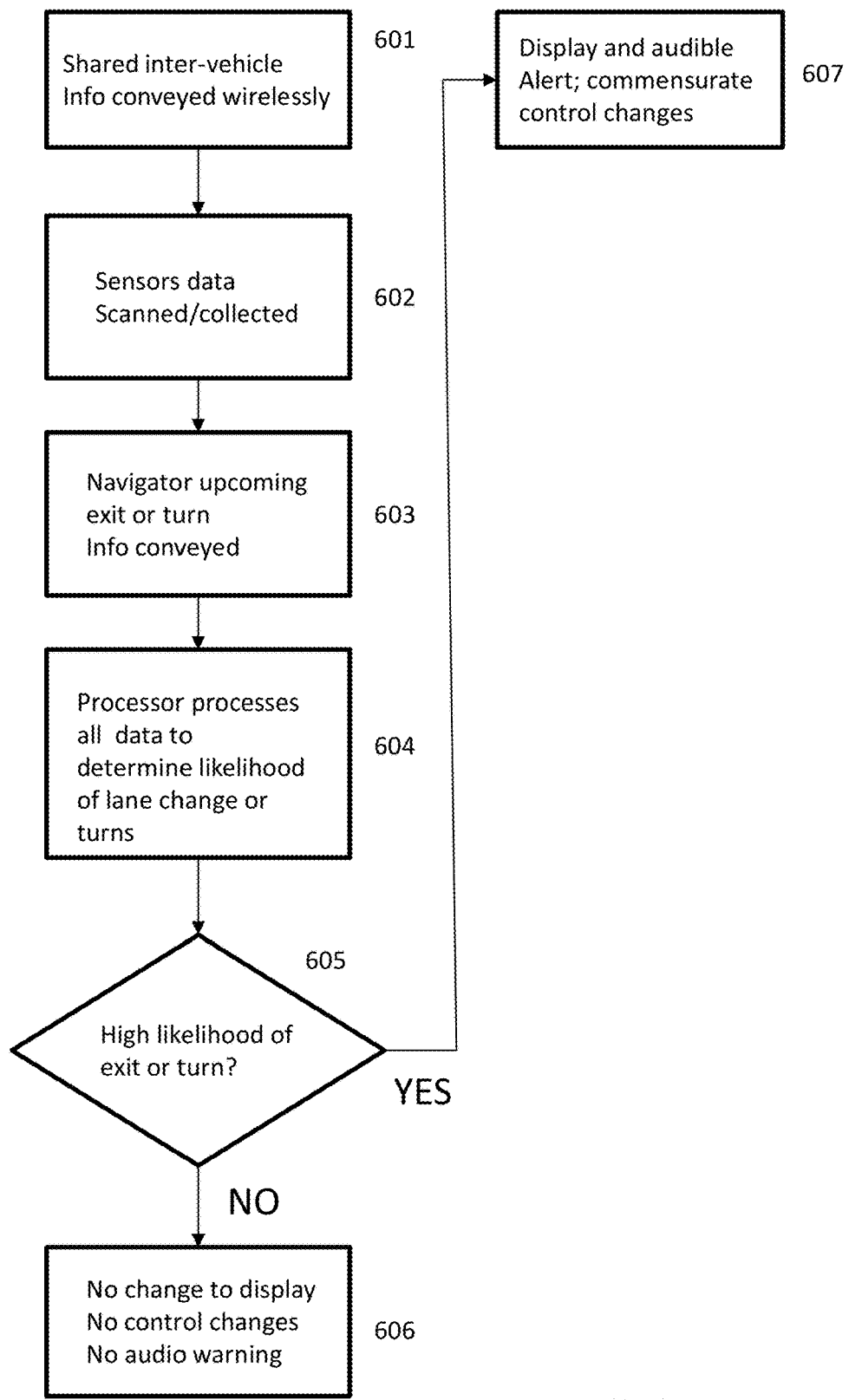
FIG. 6 depicts one embodiment of the flow for use method of the vehicle driving safety system.

FIG. 6 depicts one embodiment of a use method for the vehicular driving safety system. As shown, shared inter-vehicle data is conveyed wirelessly among the proximate vehicles (601). Each vehicle's own sensors data is gathered and conveyed to the processing subsystem (602). Shared impending navigation directives data is conveyed to the processing subsystem (603). The processing subsystem executes a program or programs to determine likelihood of impending actions (604). In a conditional method step, if the likelihood is not high, there is no change to controls, display or the conveyance of an audio warning (606). If the likelihood is high, the vehicular driving safety system will issue a display and audio alert, and will output commensurate control changes, such as deceleration, braking or turning.

The apparatus for the vehicular driving system may be all contained in a built-in vehicular system, such as an infotainment system that includes information, navigation, entertainment and so on.

Alternatively, some of the vehicular driving system may be built into an automobile system and other portions of the system could be located in an ancillary system, such as a handheld device. By ancillary system one means that this portion of the vehicular driving system is not permanently installed in the vehicle but, rather, is contained in a system which can be easily removed from the vehicle and used for other purposes, such as a smartphone.

What is claimed is:

1. A system comprising: an inter-vehicle wireless information conveyance subsystem; an inter-vehicle information distillation subsystem; a GPS receiver and satellite signal processing subsystem; an inter-vehicle information distillation subsystem; a sensors subsystem comprising cameras and transducers for detection of position, distance and speeds of proximate vehicles; a processor/memory subsystem; at least one program that executes on said processor/memory subsystem for determining likelihood of impending proximate vehicle actions based on shared impending navigation directives; said at least one program operative to convey accident-avoidance navigation directives to a user based on said shared impending navigation directives; a vehicle control output subsystem; a display output subsystem; and an audio output subsystem.

2. The system as in claim 1 further comprising: said inter-vehicle wireless information conveyance subsystem may be built into a vehicle's infotainment system: said inter-vehicle information distillation subsystem may be built into said vehicle's infotainment system; said GPS receiver and satellite signal processing subsystem may be built into said vehicle's infotainment system; said inter-vehicle information distillation subsystem may be built into said vehicle's infotainment subsystem; said process/memory subsystem may be built into said vehicle's infotainment subsystem; said at least one program may reside in said vehicle's infotainment subsystem; said vehicle control output subsystem may be built into said vehicle's infotainment subsystem; said display output subsystem may be built into said vehicle's infotainment subsystem; and said audio output subsystem may be built into said vehicle's infotainment subsystem.

3. The system as in claim 1 further comprising: said processor and memory subsystem may be integrated in an ancillary device; said display output subsystem may be integrated in said ancillary device; and said audio output subsystem may be integrated in said ancillary device.

4. A method comprising: conveying inter-vehicle data wirelessly among proximate vehicles; distilling from said inter-vehicle data shared impending navigation directives among said proximate vehicles; collecting, continuously, sensors data; processing said sensors data and said shared impending navigation directives; determining a likelihood of an impending action by one or more of said proximate vehicles; making no change to current state of said vehicle control subsystem, said display subsystem or sail audio subsystem if said likelihood is not high; outputting control commands to steering, braking and engine-control subsystems if said likelihood is high; and outputting alert messages to said display output subsystem and audio output subsystem if said likelihood is high.

* * * * *